Aug. 30, 1955  C. B. KROMSTEN  2,716,282
GASKET CUTTER
Filed July 31, 1952
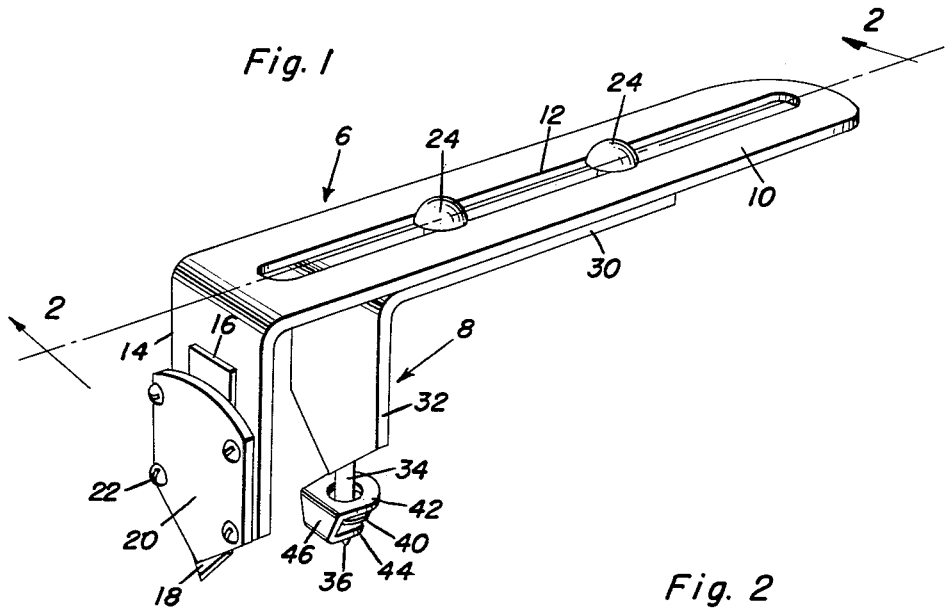
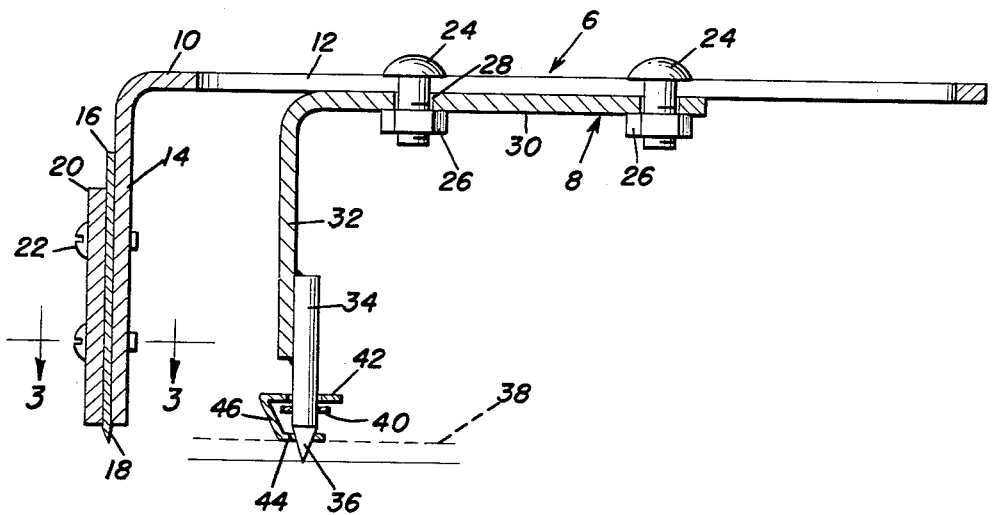
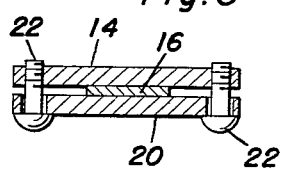
Carl B. Kromsten
INVENTOR.
BY *Clarence A. O'Brien*
*and Harvey B. Jackson*
Attorneys

United States Patent Office 2,716,282
Patented Aug. 30, 1955

2,716,282
GASKET CUTTER

Carl B. Kromsten, San Francisco, Calif.

Application July 31, 1952, Serial No. 301,884

2 Claims. (Cl. 30—310)

The present invention relates to certain new and useful improvements in hand tools and implements, generally speaking, and has more particular reference to one which is likened to a scriber but is primarily adapted to be used for cutting gaskets from sheet packing material whether the gaskets be circular or of ring-like or annular form.

An object of the invention is to structurally, functionally and otherwise improve upon similarly constructed and performing circularly actuatable cutters, and, in so doing, to provide one in which manufacturers and users find their respective requirements and well intended and performing needs fully met.

A further object of the invention is to provide a construction in which the components or parts are well chosen and mechanically associated to maintain the utmost in simplicity of construction and durability and in which quick keen cutting results are assured.

It is also an object of the invention to provide a gasket cutter in which the components cooperate in such a manner as to make for greater convenience and compactness and to make it possible to collapse or fold the device in order that it may be easily stowed away in one's tool box or elsewhere.

Briefly, the invention has to do with two complemental units which are L-shaped wherein the downturned end of what may be called the main unit is provided with a readily attachable and detachable cutting blade, the downturned end of the secondary unit being provided with a centering and penetrating and anchoring pin which coacts properly with the cutter blade.

Then, too, novelty is predicated on the aforementioned construction wherein simple and practical ways and means are provided on the pointed end of the penetrating pin to prevent the pin from sinking too deeply into the sheet material whereby to thus insure a true circular movement of the cutter blade about the center provided by said pin.

Other objects, features and advantages will become more readily apparent from the following description and the accompanying sheet of illustrative drawings.

In the accompanying drawings wherein like numerals are employed to designate like parts throughout the views:

Figure 1 is a perspective view of a gasket cutter constructed in accordance with the principles of the present invention.

Figure 2 is a section on the line 2—2 of Figure 1, looking in the direction of the arrows.

Figure 3 is a cross section on the line 3—3 of Figure 2 looking in the direction of the arrows.

Referring now to the drawings by way of reference numerals the primary L-shaped member or unit, which is of metal or the like, is denoted by the numeral 6 and the companion relatively adjustable unit, also L-shaped, is denoted by the numeral 8. The unit 6 comprises an elongated arm 10 which may be said to be normally in a horizontally operating position and said arm is provided with a central slot 12. The shorter vertical arm is denoted at 14 and this provides a mount and backing for the readily applicable and removable cutting blade 16. The pointed end of the blade is denoted at 18. The numeral 20 designates a clamping plate which attaches to the backing plate 14 and is held in position by readily applicable and removable fasteners or screws 22. The two units 6 and 8 are secured together by way of bolts 24—24 having assembling and clamping nuts 26—26. The bolts are fitted into openings provided therefor as at 28 in the longer limb or arm 30 of the unit 8. The shorter depending vertical arm, which parallels the corresponding arm 14 is denoted by the numeral 32 and has its lower end terminating on a plane above the lower end of the companion arm 14, said lower end carrying center pin and pivot. This pin is denoted by the numeral 34 and is welded or otherwise secured to the V-pointed lower end portion of the arm 32 where it projects beyond said lower end and where its lower end is formed with a conical penetrating point 36. The stated point 36 is adapted to embed itself in the sheet material which is to be cut in the manner shown in dotted lines in Figure 2 where the material is denoted by the numeral 38. Penetration check means is provided and this comprises a washer 40 which is fixed on the pin 34 just above the penetrating point 36. There is a U-shaped clip which has an upper apertured arm portion 42 fitting on the pin 34 and held in place by the washer and has an apertured spaced parallel lower portion 44 which surrounds the penetrating point and provides a stop, the two portions 42 and 44 being joined together at corresponding ends by a connecting web 46.

It is evident that the two L-shaped units are readily adjustable in relation to each other so that it is possible to regulate the distance between the center point 36 and the cutting point 18. It is also possible to unbolt the two units and to turn them around and to get greater extension or distance between the center point and cutting blade wherever a gasket or work piece of a considerable diameter is desired.

The units 6 and 8 may be formed from two simple pieces of rigid strap iron with said arms or arm portions bent at 90°.

The stop-check means may be fashioned from a length of metal bent upon itself between its ends in a somewhat obvious fashion. First, the end portion 42 is slipped over the lower end of the pin 34 and then the washer 40 is put in position, this before the portions 44 and 46 are bent into U-shaped form. Then, the portions 44 and 46 may be readily bent into cooperating shape.

It will be noticed that the lower ends of the so-called short arm 14 and clamping plate 20 are V-shaped with their respective apices coplanar as shown in Figure 2 and terminating in a plane which, as before indicated, is below the plane in which the apex of the V-shaped lower end of the arm 32 terminates. These special V-shaped terminal ends provide work clearance spaces for ready and effective use of the over-all instrumentality. It will be further noted that the aperture in the arm 44 of the U-shaped clip or member jambs against and limits the upward movement of said arm and thus restricts the degree that the point 36 projects through and beyond the aperture in said arm 44. On the other hand, the arm 42 is parallel to the arm 44 and is adapted to come into contact with the washer 40 whereby said washer keeps the clip in its desired operating position on the pin 34 at all times. The clip can rotate however so that it is possible to clearly observe the relative position of all parts without too much difficulty or hindrance.

In using the gasket cutter the desired radius is established between the center point 36 and the point of the cutting blade, that is point 18. The center point is thrust slightly into the sheet packing material and by a light pressure upon the cutter in a rotating movement around the center point a circular gasket is cut from the packing material as is obvious. It is also possible with the same tool to make inside and outside annular cuts by properly adjusting the cutting blade in relation to the center point and to thus turn out what may be called a ring-like gasket.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A gasket cutter of the class described comprising a first L-shaped unit having long and short arms at approximate right angles with each other, a cutter blade removably mounted on the short arm, a second L-shaped unit detachably and adjustably mounted on the long arm of said first unit and including long and short arms, the short arm thereof terminating at its lower end in a V-shaped portion, a centering pin cylindrical in cross-section and of limited cross-section affixed to the V-shaped end and projecting beyond the vertex thereof and terminating in a penetrating point, a washer affixed to said pin, a U-shaped member embodying upper and lower apertured spaced parallel arms connected at corresponding ends with a bight portion, the upper apertured arm being slidably and rotatably mounted on said pin above said washer, the pointed end of the pin extending through and beyond the aperture in the lower arm of said U-shaped member.

2. A gasket cutter comprising a first L-shaped unit embodying a longitudinally slotted long arm and a short arm at right angles to one end of the long arm, said short arm being generally V-shaped at its lower end, a clamping plate superimposed against and separably bolted on one face of said short arm and having a correspondingly V-shaped lower end registering with the V-shaped lower end of said short arm, said short arm providing a backing plate, a blade interposed between the backing plate and the clamping plate and having its cutting end projecting and exposed beyond the vertices of the respective V-shaped lower end portions of the short arm and clamping plate, a second L-shaped unit embodying a long arm slidably contacting the underneath side of the first named long arm and detachably and adjustably joined thereto, and provided at one end with a short arm in approximate spaced parallelism with respect to the first named short arm and the lower end thereof being V-shaped with its vertex in general alignment with the vertices first named and also in a plane above the plane occupied by said vertices, said respective L-shaped units being relatively broad metal strap members, a vertical pin of relatively small cross-section superimposed against one side of the short arm of the second named L-shaped unit and affixed thereto and in lengthwise alignment with the vertex adjacent thereto and projecting beyond said vertex and terminating in a penetrating point adapted to penetrate the article to be cut, a washer affixed to an intermediate portion of said pin, and a U-shaped clip having spaced parallel apertured arms and a bight connecting the arms at corresponding ends, there being an upper arm slidably and rotatably mounted on the pin above the plane of the washer and a lower arm below the plane of the washer, the pointed end of said pin extending through and beyond the aperture in said lower arm.

References Cited in the file of this patent
UNITED STATES PATENTS

| | | |
|---|---|---|
| 143,738 | Whipple | Oct. 14, 1873 |
| 164,675 | Cushman | June 22, 1875 |
| 457,227 | Sigsbee | Aug. 4, 1891 |
| 1,246,925 | Hunt | Nov. 20, 1917 |
| 1,423,828 | Butterfield | July 25, 1922 |
| 2,505,236 | Dooley | Apr. 25, 1950 |